United States Patent
Huffman et al.

(10) Patent No.: US 6,640,274 B1
(45) Date of Patent: Oct. 28, 2003

(54) METHOD AND APPARATUS FOR REDUCING THE DISK DRIVE DATA TRANSFER INTERRUPT SERVICE LATENCY PENALTY

(75) Inventors: Amber D. Huffman, Banks, OR (US); Knut S. Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 09/644,275

(22) Filed: Aug. 21, 2000

(51) Int. Cl.⁷ .......................... G06F 13/24; G06F 13/26
(52) U.S. Cl. .................. 710/260; 710/264; 710/266
(58) Field of Search ........................... 710/260–269

(56) References Cited

U.S. PATENT DOCUMENTS 5,727,218 A * 3/1998 Hotchkin .................. 710/260
5,864,712 A * 1/1999 Carmichael et al. .......... 710/20
5,896,540 A * 4/1999 Asano et al. ................ 710/260
6,490,651 B1 * 12/2002 Shats et al. ................. 711/112

FOREIGN PATENT DOCUMENTS

US  WO 01/46793 A2 * 6/2001 ............. G06F/3/06

* cited by examiner

*Primary Examiner*—Tim Vo
(74) *Attorney, Agent, or Firm*—Mark V. Seeley

(57) ABSTRACT

A method and apparatus for reducing the disk drive data transfer interrupt service latency penalty is described. The method comprises beginning a data transfer between a disk drive and a host system, issuing an interrupt before the transfer is complete, and then completing the data transfer. This method may be implemented on a computer assembly that includes a processor, an input/output controller, and a scatter/gather list, which is stored in memory, that includes an entry that will cause the input/output controller to generate the interrupt.

2 Claims, 3 Drawing Sheets

METHOD AND APPARATUS FOR REDUCING THE DISK DRIVE DATA TRANSFER INTERRUPT SERVICE LATENCY PENALTY

FIELD OF THE INVENTION

The present invention relates to I/O controllers and device drivers that may program them. More specifically, the invention relates to a method and apparatus for reducing the disk drive data transfer interrupt service latency penalty.

BACKGROUND OF THE INVENTION

Before data may be read from, or written to, a computer's hard drive, a host system must issue a read or write request to the hard drive. In response to such a request, the hard drive in concert with a DMA engine transfers the data to, or from, the host system. The hard drive then issues an interrupt to inform a device driver that the transfer is complete. Because that interrupt is not issued until the end of the data transfer, there is a delay between data transfer completion and device driver notification of that event. That delay, which results from the command overhead inherent in routing the interrupt from the disk drive to the operating system and then to the driver, can be significant—e.g., 10 microseconds for each disk access. Eliminating, or reducing, such an interrupt service latency penalty could significantly enhance a computer's performance.

Accordingly, there is a need for an apparatus and method that reduces the command overhead associated with the transfer of data between a disk drive and a host system. The present invention provides such an apparatus and method.

DETAILED DESCRIPTION OF THE PRESENT INVENTION

A method and apparatus for reducing the disk drive data transfer interrupt service latency penalty is described. The method comprises beginning a data transfer between a disk drive and a host system, issuing an interrupt before the transfer is complete, and then completing the data transfer. This method may be implemented on a computer assembly that includes a processor, an input/output controller, and a scatter/gather list, which is stored in memory, that includes an entry that will cause the input/output controller to generate the interrupt.

Figure 1:
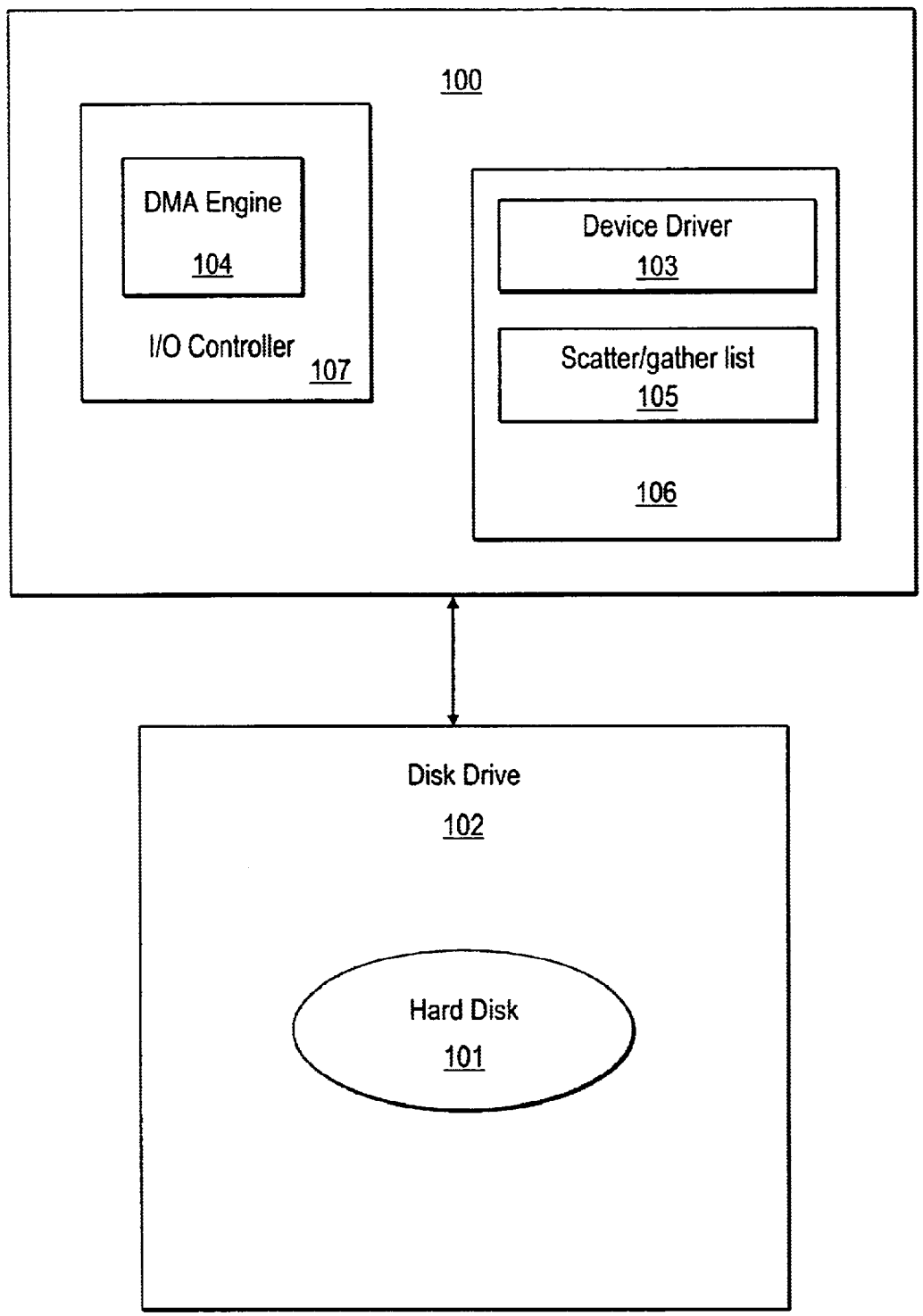
FIG. 1 is a block diagram representing a disk drive and a host system.

Before describing the method and apparatus of the present invention in detail, a brief overview of how a typical system operates to read data from, and write data to, a hard disk is provided with reference to FIG. 1. As shown in FIG. 1, a host system 100 reads data from, or writes data to, a hard disk 101 located in disk drive 102. Disk drive 102 may be part of host system 100, or instead be an external drive. Host system 100 executes applications or other computer programs. Those programs may deliver commands, via the operating system ("OS"), to device driver 103 that instruct it to read data from, or write data to, hard disk 101. In response, device driver 103 creates scatter/gather list 105 that includes entries corresponding to locations in memory 106 that will receive data from hard disk 101 or that contain data that will be transferred from the host system to the hard disk.

After creating scatter/gather list 105, device driver 103 causes data to be transferred between the hard disk and the host system. Device driver 103 starts this data transfer by writing to registers in DMA engine 104, which may be integrated into input/output controller 107, and to registers in disk drive 102, as is well known to those skilled in the art. Device driver 103 may be an ATA ("Advanced Technology Attachment") driver.

As data is transferred, DMA engine 104 consults scatter/gather list 105, which driver 103 has had stored in memory 106, and delivers data from the hard disk to the identified memory locations (for reads), or from the identified memory locations to the hard disk (for writes). Scatter/gather list 105 may have multiple entries for each data transfer. Each entry consists of a memory location and a length. See table 1 below. The sum of the lengths equals the total transfer.

TABLE 1

| scatter/gather list entry | |
|---|---|
| Address | Length |
| 0x144B0 | 4096 |

When the data transfer is complete, the disk drive triggers an interrupt. The host OS routes this interrupt to the driver. There is a latency between the time the disk drive triggers the interrupt and the driver receives it.

Figure 2:
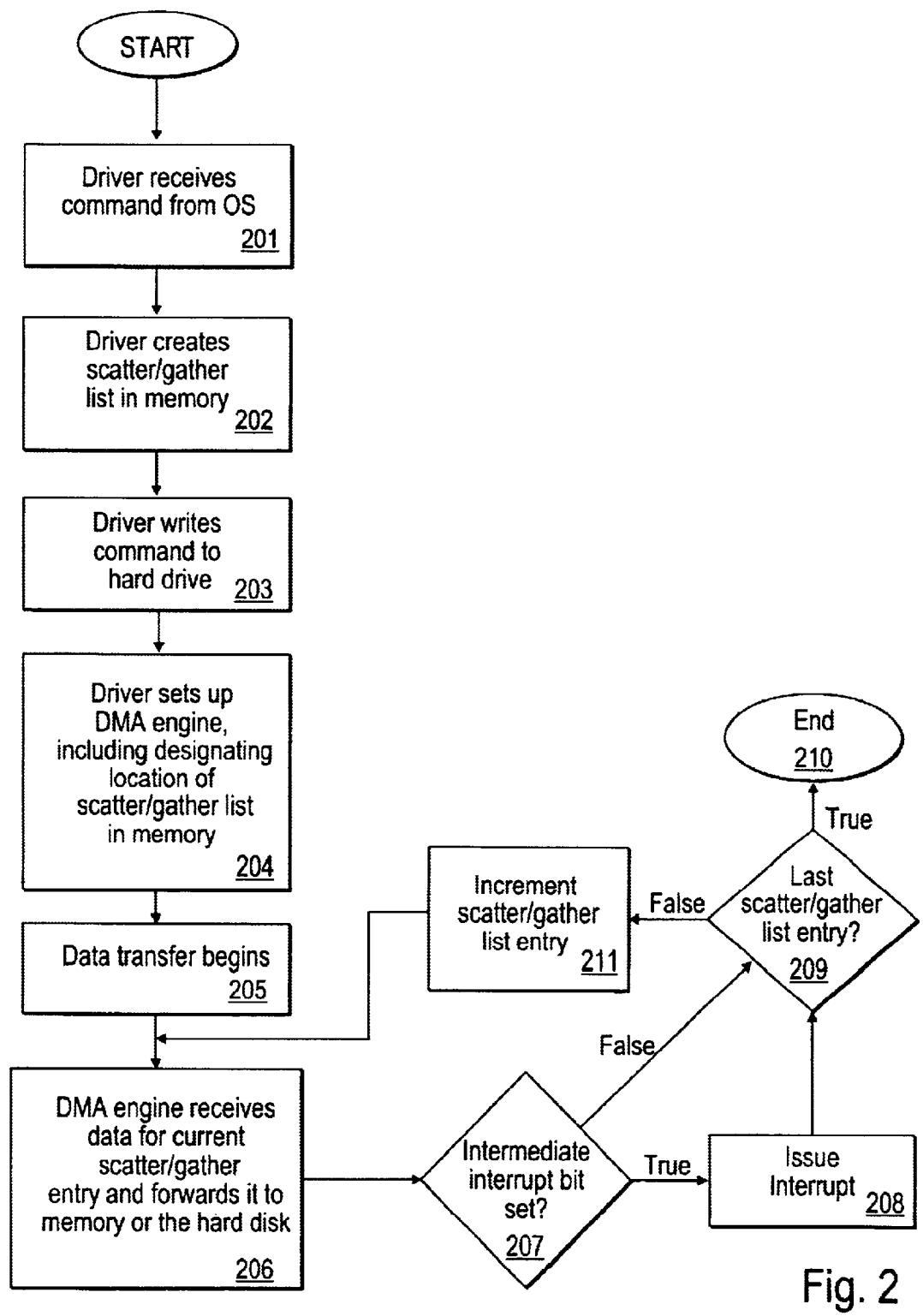
FIG. 2 is a flow chart representing an embodiment of the method of the present invention.

FIG. 2 is a flow chart that represents an embodiment of the method of the present invention for eliminating, or at least reducing, that interrupt service latency penalty. Initially, an application or other computer program instructs device driver 103, via the OS, to read (or write) a specified amount of data from (or to) hard disk 101 (block 201). In response, device driver 103 sets up scatter/gather list 105, which will direct DMA engine 104 where to store data to be read from the hard disk or where to retrieve data to be written to the hard disk (block 202).

The driver used in the method of the present invention anticipates the end of a hard drive request and programs an intermediate interrupt to take place prior to its completion. In doing so, device driver 103 specifies an amount of data to be transferred to a first address, indicates that an intermediate interrupt should issue after that transfer, then specifies an amount of data to be transferred to a second address after the interrupt has issued. See table 2 below.

TABLE 2

| scatter/gather list entries with intermediate interrupt | | |
|---|---|---|
| Address | Length | Intermediate Interrupt |
| 0x144B0 | 3896 | X |
| 0x153E8 | 200 | |

The amount of data that the second entry specifies reflects a quantity that can be transferred during the interrupt service latency. This ensures that the intermediate interrupt will overlap with the hard drive completion interrupt. The amount of data that may be transferred, while retaining that overlap, will depend upon the speed of the disk drive and the length of the interrupt service latency. Optimally, an amount of data should be selected such that the time required for the interrupt to reach the device driver is approximately equal to the time required to complete the data transfer. If, for example, the interrupt service latency is 10 microseconds and the delivery rate of the disk drive is 20 MB/second, then the driver will program the scatter/gather list to trigger an intermediate interrupt 200 bytes before the end of the transfer—as indicated in table 2. By the time that intermediate interrupt (which will experience an interrupt service latency like that of the disk drive completion interrupt) reaches the driver, the data transfer will be complete.

After programming scatter/gather list 105, device driver 103 writes the command (which can be either a read or write) to disk drive 102 (block 203) and sets up DMA engine 104, which includes designating the location of scatter/gather list 105 in memory 106 (block 204). At this point, data transfer between hard disk 101 and the host system begins (block 205). For each scatter/gather entry, DMA engine 104 delivers (in the case of reads) or retrieves (in the case of writes) data into, or from, the appropriate location in memory 106 (block 206). For each entry, DMA engine 104 then checks whether the intermediate interrupt bit has been set (block 207). If the bit has been set, the interrupt is issued. In the table 2 example, this occurs after the transfer of 3896 bytes to the specified address (block 208).

After the interrupt is issued, DMA engine 104 checks whether it has processed the last scatter/gather list entry (block 209). If true, then the data transfer is complete (block 210). If false, the DMA engine consults the next scatter/gather list entry (block 211) and continues to deliver data in accordance with the instructions provided. To reduce interrupt service latency, the method of the present invention includes another scatter/gather list entry after the intermediate interrupt is issued—as described above.

In a preferred embodiment of the present invention, the DMA engine causes an input/output controller to issue the intermediate interrupt. After a short delay (e.g., 10 microseconds) that is caused by the interrupt and software latency in responding to it, device driver 103 receives notification of the interrupt. In response, the driver informs other processes executing on the host system that the data transfer has been completed. During the time it takes for the interrupt to reach the driver, another scatter/gather list entry, i.e., the 200 byte entry shown in table 2, may be processed to complete the hard disk request. As shown in FIG. 2, when the intermediate interrupt bit is not set for a particular scatter/gather list entry, DMA engine 104 proceeds to check, after the data transfer, whether it has processed the last scatter/gather list entry—without first generating an intermediate interrupt.

By using an intermediate interrupt in this fashion, it is possible to overlap completion of a data transfer with the interrupt service latency. By the time the device driver assumes control, enabling it to report that the command has completed, the command will have been satisfied—as its completion occurred during the interrupt latency. Although the driver would still check the hard disk's status information to ensure that the command completed successfully, before reporting that fact, such a check would confirm command completion. By continuing to transfer data while the driver waits to be notified of the interrupt, interrupt service latency does not stall data transfer. It follows that removing such an interrupt service latency penalty will enhance system performance.

Figure 3:
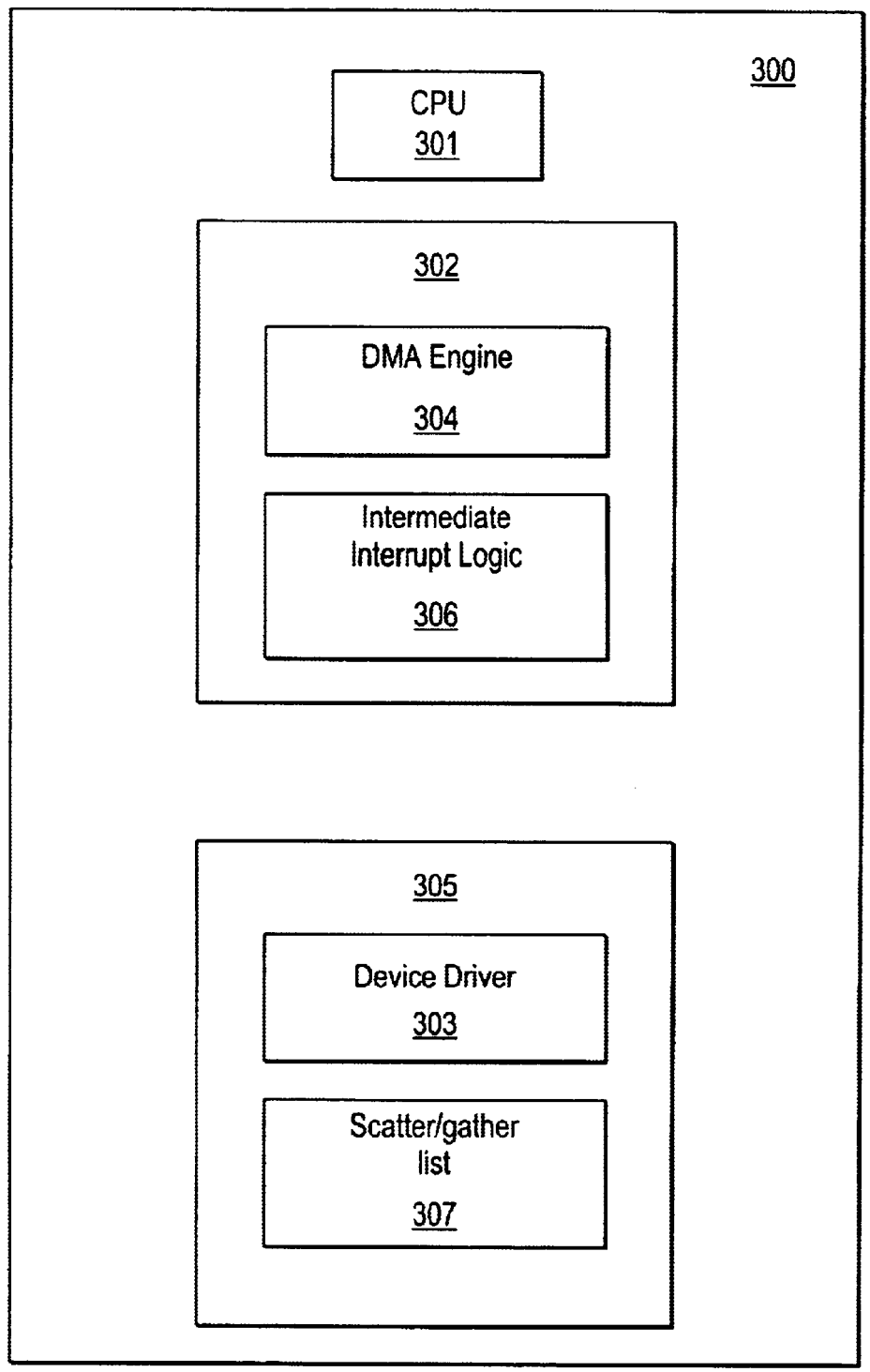
FIG. 3 is a block diagram representing a computer assembly that may be used to carry out the method of the present invention.

FIG. 3 is a block diagram representing a computer assembly that may be used to carry out the method of the present invention. Computer assembly 300 includes processor 301, input/output controller 302, device driver 303, DMA engine 304 and memory 305. Processor 301 executes instructions included in device driver 303 in the conventional manner. Processor 301 preferably is a Pentium® III, Pentium® IV or Itanium™ processor manufactured by Intel Corporation, but may be a later generation Intel processor or other Intel Architecture compatible processor, a RISC processor, or other device capable of processing data and instructions. Input/output controller 302 includes intermediate interrupt logic 306, which DMA engine 304 may invoke in response to an intermediate interrupt entry included in scatter/gather list 307 (which is stored in memory 305)—as described above. Input/output controller 302 delivers that interrupt to the OS, which forwards it to device driver 303. Input/output controller 302 preferably comprises the Intel® 82801 BA I/O Controller Hub 2 ("ICH2"), but may be another device having intermediate interrupt capability.

The method and apparatus of the present invention improves system performance by eliminating, or at least reducing, disk drive data transfer interrupt service latency. Although the foregoing description has specified a method and apparatus for accomplishing that beneficial result, those skilled in the art will appreciate that many modifications and substitutions may be made. Accordingly, it is intended that all such modifications, alterations, substitutions and additions be considered to fall within the spirit and scope of the invention as defined by the appended claims.

What is claimed is:

1. A method for reducing the disk drive data transfer interrupt service latency Penalty comprising:

beginning a data transfer between a disk drive and a host system;

issuing an interrupt before the transfer is complete; and completing the data transfer, wherein the time required for the interrupt to reach a device driver is approximately equal to the time required to complete the data transfer after the interrupt is issued.

2. A computer program stored on a computer readable medium for reducing the disk drive data transfer interrupt service latency penalty, the computer program comprising instructions that cause a computer to begin a data transfer between a disk drive and a host system;

issue an interrupt before the transfer is complete; and complete the data transfer, wherein the instructions ensure that the time required for the interrupt to reach a device driver is approximately equal to the time required to complete the data transfer after the interrupt is issued.

* * * * *